(12) United States Patent
Roethling et al.

(10) Patent No.: US 11,989,024 B2
(45) Date of Patent: May 21, 2024

(54) METHOD FOR OPERATING AN INDUSTRIAL TRUCK OPERABLE IN AN AT LEAST PARTIALLY AUTOMATED MANNER

(71) Applicant: Robert Bosch GmbH, Stuttgart (DE)

(72) Inventors: Frank Roethling, Stuttgart (DE); Markus Brodt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 174 days.

(21) Appl. No.: 17/502,871

(22) Filed: Oct. 15, 2021

(65) Prior Publication Data

US 2022/0121212 A1 Apr. 21, 2022

(30) Foreign Application Priority Data

Oct. 21, 2020 (DE) .................. 10 2020 213 299.2

(51) Int. Cl.
  *G05D 1/02* (2020.01)
  *B60Q 1/34* (2006.01)
  *G05D 1/00* (2006.01)

(52) U.S. Cl.
  CPC ............ *G05D 1/0214* (2013.01); *B60Q 1/34* (2013.01)

(58) Field of Classification Search
  CPC ......... G05D 1/0214; G05D 2201/0216; B60Q 1/34; B60W 60/0015; B62D 63/02
  See application file for complete search history.

(56) References Cited

U.S. PATENT DOCUMENTS

| | | | |
|---|---|---|---|
| 5,646,590 A * | 7/1997 | Dembicks ............... | B60Q 1/34 340/474 |
| 2011/0202247 A1 | 8/2011 | Takeoka | |
| 2012/0310465 A1 * | 12/2012 | Boatright .......... | G01C 21/3661 701/25 |
| 2014/0114526 A1 | 4/2014 | Erb | |
| 2014/0316633 A1 | 10/2014 | Tsujimoto et al. | |
| 2015/0170498 A1 | 6/2015 | Beggs et al. | |
| 2018/0335293 A1 * | 11/2018 | Cheng .................. | G01D 11/245 |
| 2019/0220005 A1 | 7/2019 | Flottran et al. | |
| 2020/0401147 A1 * | 12/2020 | Lim ................ | B60W 30/18163 |

FOREIGN PATENT DOCUMENTS

| DE | 10 2010 028 911 A1 | 11/2011 |
|---|---|---|
| DE | 10 2018 100 758 A1 | 7/2019 |

OTHER PUBLICATIONS

Ullrich et al.: "Fahrerlose Transportsysteme: Eine Fibel—mit Praxisanwendungen—zur Technik—fur die Planung", Jan. 19, 2011, XP055525050.
"Safety of industrial trucks—Driverless trucks and their systems," DIN EN 1525, Sep. 1997, European Committee for Standardization (21 pages).

* cited by examiner

*Primary Examiner* — Rodney A Butler

(74) *Attorney, Agent, or Firm* — Maginot, Moore & Beck LLP

(57) ABSTRACT

The disclosure relates to a method for operating an industrial truck operable in an at least partially automated manner, in which at least the following steps are carried out in an automated manner by the industrial truck: a) detecting that the industrial truck approaches a point at which it is to change its driving direction, b) checking at least one predefined direction change criterion for the intended driving direction change, and c) stopping the industrial truck if the at least one direction change criterion is not met.

11 Claims, 4 Drawing Sheets

METHOD FOR OPERATING AN INDUSTRIAL TRUCK OPERABLE IN AN AT LEAST PARTIALLY AUTOMATED MANNER

This application claims priority under 35 U.S.C. § 119 to application no. DE 10 2020 213 299.2, filed on Oct. 21, 2020 in Germany, the disclosure of which is incorporated herein by reference in its entirety.

TECHNICAL FIELD

The disclosure relates to a method for operating an industrial truck operable in an at least partially automated manner. Furthermore, a computer program, a machine-readable storage medium, a control unit, and an industrial truck are also specified.

BACKGROUND

Industrial trucks operable in an at least partially automated or even autonomous manner are known, these can generally also be referred to as (automated or autonomous) industrial trucks (automated guided vehicles; abbreviated: AGVs). Corresponding industrial trucks are defined, for example, in EN 1525. According to EN 1525, as soon as it approaches points at which it can drive further in more than one direction, an industrial truck has to indicate the intended driving direction in a well visible manner.

SUMMARY

Proceeding therefrom, the disclosure is based on the object of at least partially solving the disadvantages or problems described in conjunction with the prior art. In particular, in an industrial truck operable in an at least partially automated manner, personal protection during driving direction changes is to be improved.

These objects are achieved by the features of the disclosure. Advantageous embodiments result from the disclosure.

A method for operating an industrial truck operable in an at least partially automated manner contributes thereto, in which at least the following steps are carried out in an automated manner by the industrial truck:
  a) detecting that the industrial truck approaches a point at which it is to change its driving direction,
  b) checking at least one predefined direction change criterion for the intended driving direction change,
  c) stopping the industrial truck if the at least one direction change criterion is not met.

Steps a), b), and c) can be carried out, for example, at least once and/or repeatedly in the specified sequence to carry out the method. In particular, steps b) or steps b) and c) can be carried out repeatedly multiple times in succession here (possibly also continuing during the direction change). The method can be carried out, for example, by means of a control unit also described here and/or an industrial truck also described here. In the method, at least steps a), b), and c) can advantageously be carried out autonomously by the industrial truck.

The method advantageously contributes to being able to improve the personal protection during driving direction changes. Furthermore, the method can contribute to carrying out checked or monitored cornering in an advantageously automated manner, in particular by means of monitoring of the driving velocity and/or the rotational velocity.

The industrial truck can be, for example, one as defined in EN 1525. The industrial truck can be configured for at least partially automated and/or autonomous (driving) operation. The industrial truck generally has a cargo platform. Furthermore, the industrial truck can have a front structure. The front structure can have an essentially vertical rear wall toward the cargo platform.

In step a), it is detected that the industrial truck approaches a point at which it is to change its driving direction. In particular, this can also be described in other words so that the industrial truck detects that it is to approach or is approaching a point at which it is to perform a driving direction change. In particular, it is detected that a fork is to be approached or is being approached. The point can be, for example, a defined point on the planned driving route of the industrial truck.

In step b), at least one predefined direction change criterion for the intended driving direction change is checked (or monitored). The intended driving direction change can in particular be a direction change to the left or a direction change to the right. In other words, the driving direction change can in particular relate to a turnoff process and/or cornering. Multiple predefined direction change criteria can also be checked or monitored in step b). The checking or monitoring can be carried out permanently or continuously.

The checking or monitoring can be carried out before and/or during the driving direction change or before and/or during cornering.

In step c), the industrial truck is stopped if the at least one direction change criterion is not met. In general, the direction change criterion is a positively defined criterion. In particular, the direction change criterion is to be considered as "not met" if a (positively defined) expected (criterion) state is not or was not achieved. In other words, this means in particular that the direction change criterion is "not met", for example, if a deviation from a (positively defined) expected (criterion) state exists. The further driving of the industrial truck can also be released according to step c) if the at least one direction change criterion is met again.

At least the checking or monitoring according to step b) and/or the possibly required stopping according to step c) can advantageously be carried out at a defined performance level (abbreviated: PLr), in particular at a PLr d according to ISO 13849.

Steps a) to c) or at least steps b) and c) or in particular at least step b) can be carried out by a safety control unit of the industrial truck, for example a safety control module of a control unit of the industrial truck, which is provided in addition to a driving control unit of the industrial truck, for example comprising a robot control module and/or a motion control module of the control unit of the industrial truck. The driving control unit, in particular the motion control module, generally effectuates the (actual) driving activation or driving operation and its change(s), for example by corresponding activation or specification of target speeds of the motors and/or of the driven wheels of the industrial truck. Moreover, the driving control unit, in particular the motion control module, can specify the driving direction display, in particular at least one driving direction change signal to be displayed.

According to one advantageous embodiment, it is proposed that the at least one predefined direction change criterion requires that a defined driving direction change signal of the industrial truck to be displayed for the intended driving direction change is activated. In this context it can be required, for example, that a specific turn signal displaying the intended driving direction change or a defined group of turn signals displaying the intended driving direction change is activated (for example: left turn signal(s) for a direction change to the left and/or right turn signal(s) for a direction change to the right). This can contribute to providing advantageous monitoring of the specifications for the driving direction display, in particular to avoiding incorrect specifications.

The (above-explained) safety control unit, in particular the safety control module, can check or monitor in this context whether the driving direction display is specified or was specified correctly or so as to be matching with the driving activation by the driving control unit. The safety control unit can thus monitor, for example, the driving control unit as to whether a turnoff signal (turn signal) is in accordance with the actual driving activation.

According to a further advantageous embodiment, it is proposed that the at least one predefined direction change criterion requires that a defined driving direction change signal of the industrial truck to be displayed for the intended driving direction change was active for a predefined lead time before initiating the direction change. This advantageously contributes to persons in the surroundings of the industrial truck having sufficient time to perceive the driving direction change signal before the industrial truck changes its driving direction and/or a driving direction change not displayed in a timely manner advantageously being able to be prevented.

According to a further advantageous embodiment, it is proposed that the at least one predefined direction change criterion requires that the driving velocity of the industrial truck is less than or equal to a predefined limiting value. In this case, a limiting value for cornering is in particular less than a limiting value for straight-ahead driving. This can also contribute to improving the personal protection since persons in the surroundings of the industrial truck can generally react better to a slower direction change (in comparison to straight-ahead driving) of the industrial truck.

According to a further advantageous embodiment, it is proposed that the at least one predefined direction change criterion requires that the rotational velocity of the industrial truck is less than or equal to a limiting value predefined as a function of the (linear) driving velocity of the industrial truck. Furthermore, the limiting value for the rotational velocity can be defined as a function of the type of the direction change, in particular to the left (positive limiting value for the rotational velocity) or to the right (negative limiting value for the rotational velocity). The dependence of the rotational velocity on the (linear) driving velocity can advantageously contribute to an advantageous linearity being achieved during the cornering and/or a defined, in particular minimal curve radius to be driven being able to be observed in a checked or monitored manner.

In this context, the direction change criterion can also (alternatively or cumulatively), for example, be predefined in dependence on the driving direction change display and/or the driving direction change signal. Thus, for example, the direction change criterion relating to the rotational velocity can be predefined in dependence on whether at least one left driving direction change signal or at least one right driving direction change signal is active. This can advantageously also contribute to the most secure possible monitoring of the cornering radius in dependence on the driving direction change signal (turn signal).

In particular, the (above-explained) safety control unit, in particular the safety control module, can check or monitor in this context whether an expected cornering track (which is in particular specified and/or activated by the driving control unit) is observed. In this context, for example, it can be provided that the safety control unit stops the industrial truck in the event of deviations from an expected cornering track.

According to a further advantageous embodiment, it is proposed that the at least one predefined direction change criterion is (at least also or also still) checked after cornering has been initiated. In other words, this can in particular also be described so that the at least one predefined direction change criterion is still checked after cornering has been initiated. For example, the at least one predefined direction change criterion can be checked before and during the cornering.

According to a further aspect, a computer program is proposed for carrying out a method described here. In other words, this relates in particular to a computer program (product), comprising commands which, upon execution of the program by a computer, prompt this computer to carry out a method described here.

According to a further aspect, a machine-readable storage medium is also proposed, on which the computer program is stored. The machine-readable storage medium is generally a computer-readable data carrier.

According to a further aspect, a control unit is also proposed for an industrial truck operable in an at least partially automated manner, wherein the control unit is configured to carry out a method described here. The control unit (controller) can comprise, for example, a computer which can execute commands to carry out the method. For this purpose, the computer or the control unit can execute, for example, the specified computer program. For example, the computer or the control unit can access the specified storage medium to be able to execute the computer program. The control unit can be, for example, a safety control unit. Alternatively or cumulatively, the method can be carried out, for example, by a safety control module of the control unit. In addition, the control unit can also comprise a robot control module and/or a motion control module.

According to a further aspect, an industrial truck operable in an at least partially automated manner having the control unit is also proposed. Alternatively or cumulatively, this can also be described as an industrial truck operable in an at least partially automated manner which is configured to carry out a method described here. The industrial truck is additionally generally configured for at least partially automated or autonomous (driving) operation.

In summary, a particularly advantageous embodiment of the solution described here can also be described in other words in particular (and possibly alternatively) so that a safety control unit (SCU) in an industrial truck operable in an at least partially automated manner (in particular an autonomous transport vehicle) monitors whether a turnoff signal (turn signal) is in accordance with the actual driving activation of the vehicle. It can furthermore be provided here that in the event of deviations from an expected cornering track, the vehicle is stopped and thus brought into a safe state.

The details, features, and advantageous embodiments explained in conjunction with the method can accordingly also occur in the computer program provided here and/or the storage medium and/or the control unit and/or the industrial truck and vice versa. Reference is thus made to the statements there in their entirety for the more detailed characterization of the features.

BRIEF DESCRIPTION OF THE DRAWINGS

The solution provided here and its technical environment are explained in more detail hereinafter on the basis of the figures. It is to be noted that the disclosure is not to be restricted by the exemplary embodiments shown. In particular, if not explicitly indicated otherwise, it is also possible to extract partial aspects of the substantive matter explained in the figures and combine them with other components and/or findings from other figures and/or the present description. In the exemplary and schematic figures.

DETAILED DESCRIPTION

Figure 1:
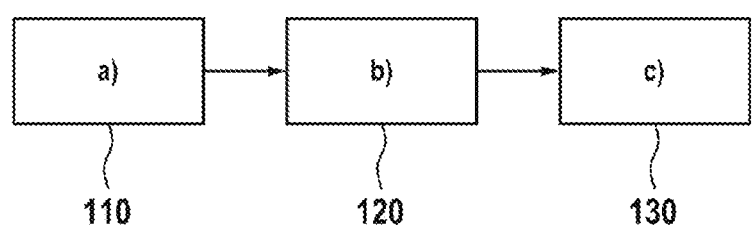
FIG. 1: shows an exemplary sequence of the method provided here.

FIG. 1 schematically shows an exemplary sequence of the method provided here. The method is used for operating an industrial truck 1 operable in an at least partially automated manner (cf. FIGS. 2 and 4 to 7). The sequence of steps a), b), and c) illustrated by the blocks 110, 120, and 130 is exemplary and can be passed through at least once in the illustrated sequence to carry out the method, for example. Step b) can be carried out repeatedly multiple times in succession here (possibly also still during the direction change). In addition, steps a) to c) are carried out in an automated manner by the industrial truck 1.

In block 110, according to step a), it is detected that the industrial truck 1 approaches a point 2 at which it is to change its driving direction. In block 120, according to step b), at least one predefined direction change criterion is checked for the intended driving direction change. In block 130, according to step c), the industrial truck 1 is stopped if the at least one direction change criterion is not met.

Figure 2:
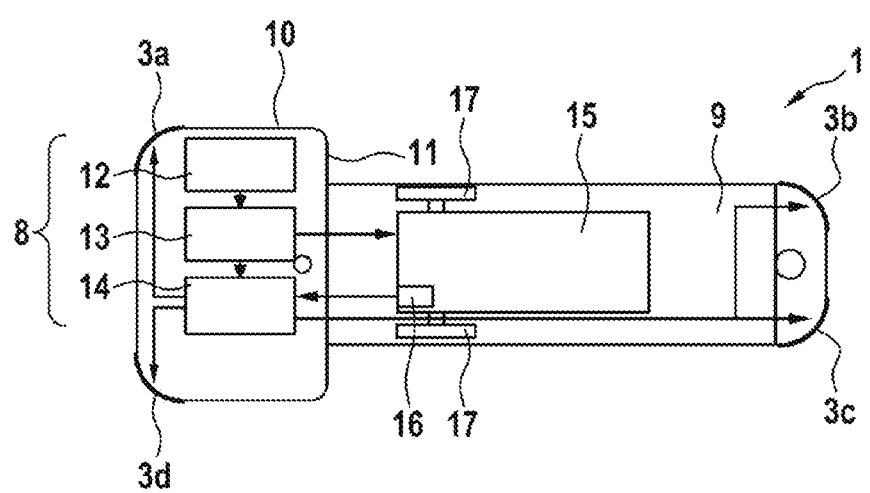
FIG. 2: shows an embodiment of an industrial truck described here in a sectional illustration.

FIG. 2 schematically shows an embodiment of an industrial truck 1 described here in a sectional illustration. The industrial truck 1 is configured for at least partially automated or autonomous (driving) operation. Furthermore, the industrial truck 1 is configured to carry out a method described here. For this purpose, the industrial truck 1 has, for example, a control unit 8 also described here. The industrial truck 1 furthermore has a front structure 10 and a cargo platform 9 here, for example. For example, the front structure 10 has an essentially vertical rear wall 11 toward the cargo platform 9 here. The cargo platform 9 is used in particular to accommodate a goods carrier 18 (cf. FIG. 4), which can be transported by means of the industrial truck 1.

The industrial truck 1 generally has four driving direction change signals 3 for the driving direction display, which can be designed in particular like a turn signal. The driving direction change signals 3 are typically a front right driving direction change signal 3a, a rear right driving direction change signal 3b, a rear left driving direction change signal 3c, and a front left driving direction change signal 3d (viewed in the driving direction).

The control unit 8 comprises here, for example, a robot control module 12 (robot control unit; abbreviated: RCU), a motion control module 13 (motion control unit; abbreviated: MCU), and a safety control module 14 (safety control unit; abbreviated: SCU). To carry out the method, the control unit 8 can be configured, for example, for the procedure described hereinafter.

The robot control module 12 specifies here, for example, the desired driving velocity 4 and the driving direction display, in particular the driving direction change signals 3 to be actuated (right, left, off), to the motion control module 13. This represents an example that and possibly how according to step a) it can be detected (by the robot control module 12 and/or the motion control module 13) that the industrial truck 1 approaches a point 2 at which it is to change its driving direction.

The motion control module 13 specifies the desired driving direction display, in particular the driving direction change signals 3 to be actuated (right, left, off), further to the safety control module 14 here, for example. Therefore, for example, the safety control module 14 can also detect according to step a) that the industrial truck 1 approaches a point 2 at which it is to change its driving direction. Moreover, the motion control module 13 calculates here, for example, the target speeds of the driven wheels 17 of the industrial truck 1 and gives them to a motor unit 15 of the industrial truck 1.

The motor unit 1 can have one or more (electric) motors, which are operationally connected, possibly via a transmission or directly, to the driven wheels 17 of the industrial truck, possibly in terms of individually driven wheels. Furthermore, FIG. 2 shows that the industrial truck 1 can have, for example, one or more speed encoders 16 (for example SIL2 rotational encoders), which can transmit the actual speeds of the motors or wheels 17 to the safety control module 14.

The safety control module 14 actuates here, for example, the driving direction change signals 3 (right, left, off) or sets the turn signals (right, left, off) in dependence on the desired driving direction display. In addition, the safety control module 14 can stop the time period which the driving direction change signals 3 or turn signals are active here, for example. The safety control module 14 moreover calculates here, for example, the instantaneous (linear) driving velocity 4 and the (instantaneous) rotational velocity 5 (around the vertical axis 23, cf. FIG. 7) of the industrial truck 1 from the actual speeds.

In particular, the safety control module 14 can (permanently) monitor the instantaneous (linear) driving velocity 4. The safety control module 14 here can, during straight-ahead driving, advantageously safely stop the industrial truck 1 at a (linear) driving velocity 4 above a predefinable limiting value of, for example, 1000 mm/s with, for example, a defined performance level (abbreviated: PLr), in particular with a PLr d according to ISO 13849.

Furthermore, the safety control module 14 can (permanently) monitor the instantaneous rotational velocity 5 (around the vertical axis 23, cf. FIG. 7) of the industrial truck 1 here, for example. In particular, the safety control module 14 can, during straight-ahead driving, advantageously safely stop the industrial truck 1 in the event of a rotational velocity 5 (symbol: ω) outside a predefinable permitted value range of, for example, $-0.14/s<\omega<+0.14/s$ with, for example, a defined performance level (abbreviated: PLr), in particular with a PLr d according to ISO 13849.

Moreover, for example, the safety control module 14 can be configured here to check at least one predefined direction change criterion for the intended driving direction change. As the direction change criterion or direction change criteria, the safety control module 14 can in particular check whether the correct driving direction change signal 3 is activated, whether the driving direction change signal 3 of the industrial truck 1 was active for a predefined lead time before initiating the direction change, whether the driving velocity 4 of the industrial truck 1 is less than or equal to a predefined limiting value 5, and/or whether the rotational velocity 6 of the industrial truck 1 is less than or equal to a limiting value 7 predefined as a function of the driving velocity 4 of the industrial truck 1.

For example, the safety control module 14 can monitor whether the correct turn signal or the incorrect turn signal or no turn signal was activated. This represents an example that and possibly how the at least one predefined direction change criterion can require that a defined driving direction change signal 3 of the industrial truck 1 to be displayed for the intended driving direction change is activated.

Furthermore, for example, the safety control module 14 can monitor whether the turn signal for the intended driving direction or driving direction change was active for the entire lead time or was not yet active for the entire lead time. This represents an example that and possibly how the at least one predefined direction change criterion can require that a defined driving direction change signal 3 of the industrial truck 1 to be displayed for the intended driving direction change was active for a predefined lead time before initiating the direction change.

Furthermore, for example, the safety control module 14 can monitor whether the instantaneous (linear) driving velocity 4 is greater than a predefined limiting value 5 (for example 700 mm/s for cornering) or is less than or equal to the predefined limiting value 5. This represents an example that and possibly how the at least one predefined direction change criterion can require that the driving velocity 4 of the industrial truck 1 is less than or equal to a predefined limiting value 5.

Furthermore, for example, the safety control module 14 can monitor whether an expanded value range (in relation to that explained above for straight-ahead travel) of the rotational velocity (symbol: $\omega$) of, for example, $\omega_{max,right}=-1.05/s-v/m$ (turn signal right) to $\omega_{max,left}=1.05/s-v/m$ (turn signal left) is (or was) exceeded or is observed. In this case, v represents the symbol for the (linear) driving velocity 4. In an alternative representation, this relates to a value range of $-1.05/s-v/m<\omega<1.05/s-v/m$. This represents an example that and possibly how the at least one predefined direction change criterion can require that the rotational velocity 6 of the industrial truck 1 is less than or equal to a limiting value 7 predefined as a function of the driving velocity 4 of the industrial truck 1. The limiting value 7 can (also) be predefined here in dependence on the direction of the direction change (left/right), for example as $-1.05/s-v/m$ for a direction change to the right and as $+1.05/s-v/m$ for a direction change to the left (wherein the signs can also be defined in reverse, depending on the definition of the reference rotational direction).

The first two of the mentioned direction change criteria are preferably checked before initiating the cornering and in particular the cornering is only initiated here when the check was successful. In addition, these direction change criteria, in particular the first of the mentioned direction change criteria, can also be (further) checked during the cornering. In particular, the last two of the mentioned direction change criteria are preferably at least also checked during the cornering, in particular to achieve an advantageous linearity during the cornering and/or to observe a defined, in particular minimal curve radius to be driven in a checked or monitored manner. This also represents an example that and possibly how the at least one predefined direction change criterion is (also) checked after cornering has been initiated. In other words, the at least one predefined direction change criterion can be checked here, for example, before and during the cornering.

The safety control module 14 can advantageously safely stop the industrial truck 1 with, for example, a defined performance level (abbreviated: PLr), in particular with a PLr d according to ISO 13849, if one or more of the direction change criteria are not met. This represents an example that and possibly how according to step c) the industrial truck 1 can be stopped if the at least one direction change criterion is not met.

The safety control module 14 can thus, for example, during cornering advantageously safely stop the industrial truck 1 at a (linear) driving velocity 4 above a predefinable limiting value 5 of, for example, 700 mm/s with, for example, a defined performance level (abbreviated: PLr), in particular with a PLr d according to ISO 13849. Furthermore, the safety control module 14, during cornering, can advantageously safely stop the industrial truck 1 at a rotational velocity 5 (symbol: $\omega$) outside a predefinable permitted value range of, for example, $-1.05/s-v/m<\omega<1.05/s-v/m$ with, for example, a defined performance level (abbreviated: PLr), in particular with a PLr d according to ISO 13849.

In principle, several of the direction change criteria mentioned as examples can also be checked at least partially in parallel or simultaneously in particular. According to one particularly preferred combination of direction change criteria that are to be checked or that are checked, the following procedure can, for example, be used in step b): if the turn signal right (driving direction change signals 3a and 3b) or the turn signal left (driving direction change signals 3c and 3d) is active for a (the entire) predefined lead time, the safety control module 14 expands the value range at a linear driving velocity 4 of, for example, up to (at most) 700 mm/s (limiting value 5) to $\omega=1.05/s-v/m$ (turn signal left) or to $\omega=-1.05/s-v/m$ (turn signal right) (limiting value 7). If the expanded value range (or the limiting value 7) is exceeded, the safety control module 14 advantageously safely stops the industrial truck 1 with PLr d according to ISO 13849. The advantageous limiting of the rotational velocity as a function of the linear velocity can advantageously additionally contribute to the driving stability of the industrial truck 1 during cornering.

Figure 3:
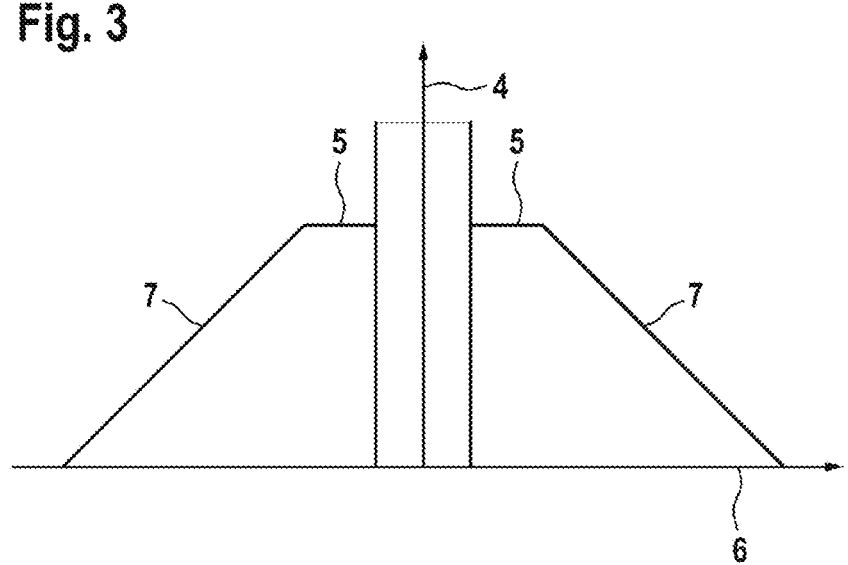
FIG. 3: shows a graphic representation of predefined limiting values for an embodiment variant of the method.

FIG. 3 schematically shows a graphic representation of predefined limiting values 5, 7 for an embodiment variant of the method. According to the illustration in FIG. 3, the (linear) driving velocity 4 is plotted over the rotational velocity 6.

Figure 7:
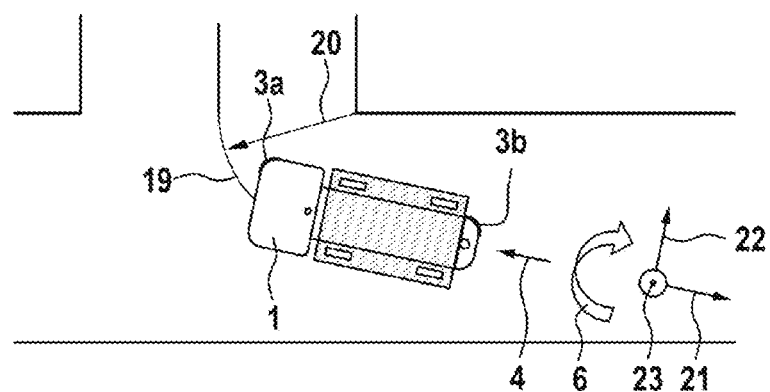

In this context, reference is made in particular also to the reference axes of the industrial truck 1 plotted by way of example in FIG. 7, in particular the longitudinal axis 21, the transverse axis 22, and the vertical axis 23, for the explanation or definition of the linear direction (longitudinal direction) and the rotational direction. The linear driving velocity typically relates to the velocity or velocity component of the industrial truck 1 in parallel to the longitudinal axis 21. The rotational velocity 6 typically relates to the rotational velocity around the vertical axis 23.

During the cornering, it can in particular be checked or monitored according to one advantageous embodiment that the value pair made up of driving velocity 4 and rotational velocity 6 remains within or below the limits illustrated by way of example in FIG. 3. The limits are formed here by the upper limiting value 5 for the (linear) driving velocity 4 during cornering and the limiting value 7 for the rotational velocity. In this case, the limiting value 7 for the rotational velocity on the right side of FIG. 3 applies for cornering to the left and the limiting value 7 on the left side of FIG. 3 applies for cornering to the right.

It can also be seen that the limiting value 7 is predefined as a function of the driving velocity 4. For example, the course of the limiting value 7 on the right side of FIG. 3 can be predefined via the equation $\omega_{max,left}=1.05/\text{s}-v/\text{m}$ (turn signal left) and the course of the limiting value 7 on the left side of FIG. 3 via the equation $\omega_{max,right}=-1.05/\text{s}-v/\text{m}$. Here the symbol ω stands for the rotational velocity and v stands for the driving velocity, s for seconds and m for meters. The inner vertical lines in FIG. 2 are only plotted for the sake of completeness and illustrate a minimum rotational velocity required for the cornering. Corresponding minimum rotational velocities are generally known in the relevant field, and so they are not described in more detail here.

FIGS. 4 to 7 schematically show an advantageous application of the method described here in a top view. The planned driving route 19, which the industrial truck 1 is to drive along automatically, is shown here by dashed lines. The point 2 at which the industrial truck 1 is to change its driving direction is plotted along this driving route 19.

Figure 4:
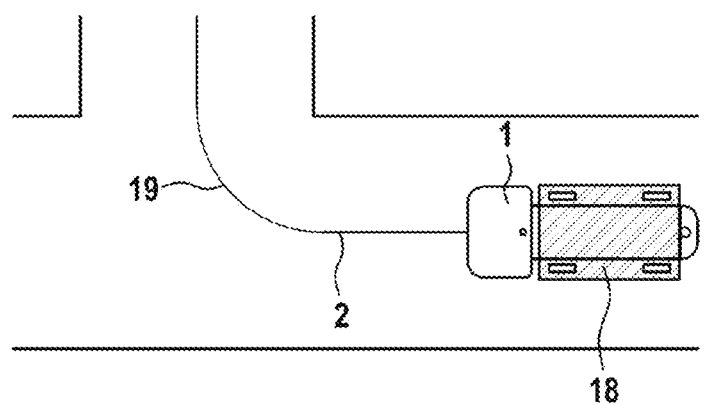
FIGS. 4-7: show an advantageous application of the method described here in a top view.
Figure 5:
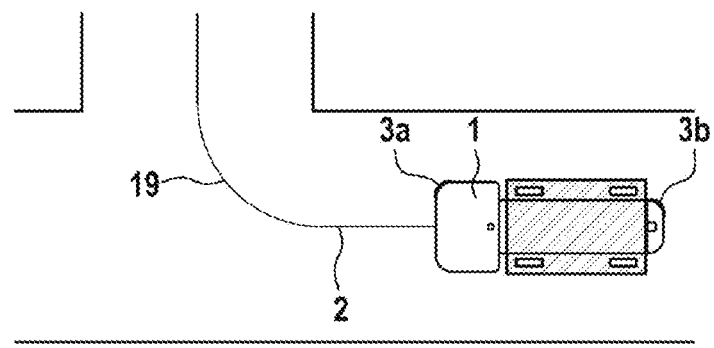

The situation is illustrated by way of example in FIG. 4 in which the industrial truck 1 approaches the point 2 at which it is to change its driving direction or at which it can drive further in more than one direction. In FIG. 5, it is shown by way of example that the industrial truck 1 displays the intended driving direction (in this example: to the right, by means of the driving direction change signals 3a and 3b) in a timely manner, in particular with a predefined lead time.

Figure 6:
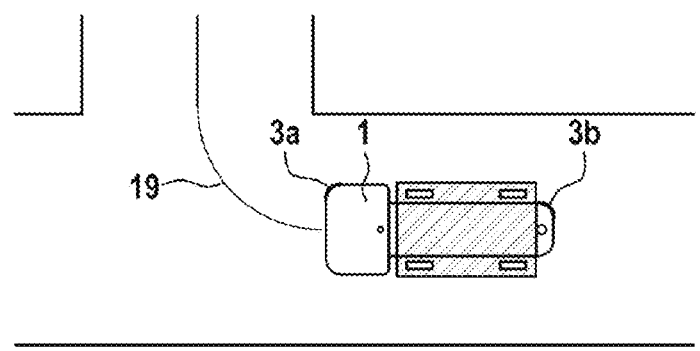

In FIG. 6, the point 2 was reached at which the cornering begins. According to one advantageous embodiment of the described method, from this moment checked or monitored cornering can be carried out in an automated manner by means of monitoring of the driving velocity 4 and the rotational velocity 6 (cf. FIG. 7). The exemplary embodiments described hereinafter relating to the above-explained direction change criteria can contribute thereto:

As soon as the cornering begins and the rotational velocity leaves the value range of straight-ahead driving ($-0.14/\text{s}<\omega<0.14/\text{s}$), the industrial truck 1 stops if:
  the turn signal for the intended driving direction was not yet active for the lead time, and/or
  the incorrect or no turn signal was activated, and/or
  the linear velocity is above a limiting value (for example: v>700 mm/s), and/or
  the expanded value range of the rotational velocity from, for example, $\omega_{max,left}=1.05/\text{s}-v/\text{m}$ (turn signal left) to $\omega_{max,right}=-1.05/\text{s}-v/\text{m}$ (turn signal right) is or was exceeded.

FIG. 7 illustrates by way of example cornering during which the at least one direction change criterion, in particular all direction change criteria (cornering conditions), are met. If the at least one direction change criterion is or if all direction change criteria are observed, the industrial truck 1 normally does not stop (except, for example, in the event of an imminent collision with another object or a person). The cornering can possibly be continued as soon as the at least one direction change criterion, in particular all direction change criteria, is or are met again.

It is furthermore shown by way of example in FIG. 7 that the direction change criterion usable according to one advantageous embodiment which requires that the rotational velocity 6 of the industrial truck 1 is less than or equal to a limiting value 7 predefined as a function of the driving velocity 4 of the industrial truck 1 can advantageously contribute to an advantageous linearity being able to be achieved during the cornering and/or a defined, in particular minimal curve radius 20 to be driven being able to be observed in a checked or monitored manner.

Therefore, a method, a computer program, a machine-readable storage medium, a control unit, and an industrial truck are specified, which at least partially solve the disadvantages or problems described in conjunction with the prior art. In particular the personal protection during driving direction changes can be improved in an industrial truck operable in an at least partially automated manner.

LIST OF REFERENCE NUMERALS 1 industrial truck
2 point
3 driving direction change signal
4 driving velocity
5 limiting value
6 rotational velocity
7 limiting value
8 control unit
9 cargo platform
10 front structure
11 rear wall
12 robot control module
13 motion control module
14 safety control module
15 motor unit
16 speed encoder
17 wheel
18 goods carrier
19 driving route
20 curve radius
21 longitudinal axis
22 transverse axis
23 vertical axis

What is claimed is:

1. An industrial truck that is operated in an at least partially automated manner, the industrial truck comprising:
  a controller configured to a) detect, in an automated manner, that the industrial truck approaches a point at which the industrial truck is to perform an intended driving direction change, b) check, in an automated manner, at least one predefined direction change criterion for the intended driving direction change, and c) stop, in an automated manner, the industrial truck in response to the at least one predefined direction change criterion not being met, wherein the at least one predefined direction change criterion requires that a driving direction change signal of the industrial truck associated with the intended driving direction change is activated,
wherein:
  the controller is further configured to check, in the automated manner, prior to initiating the driving direction change, the least one predefined direction change criterion for the intended driving direction change, and stop, in the automated manner, prior to initiating the driving direction change, the industrial truck in response to the at least one predefined direction change criterion not being met; and
  the driving direction change signal of the industrial truck is configured to alert persons in the surroundings of the industrial truck of the intended driving direction change.

2. The industrial truck according to claim 1, wherein the at least one predefined direction change criterion further requires that the driving direction change signal of the industrial truck associated with the intended driving direction change is activated for a predefined lead time before initiating the intended driving direction change.

3. A controller for an industrial truck that is operated in an at least partially automated manner, the controller configured to:
   detect, in an automated manner, that the industrial truck approaches a point at which the industrial truck is to perform an intended driving direction change;
   check, in an automated manner, at least one predefined direction change criterion for the intended driving direction change prior to initiating the driving direction change; and
   stop, in an automated manner, prior to initiating the driving direction change, the industrial truck in response to the at least one predefined direction change criterion not being met,
   wherein the at least one predefined direction change criterion requires that a driving direction change signal of the industrial truck associated with the intended driving direction change is activated.

4. The controller according to claim 3, wherein:
   the at least one predefined direction change criterion further requires that the driving direction change signal of the industrial truck associated with the intended driving direction change is activated for a predefined lead time before initiating the intended driving direction change; and
   the driving direction change signal of the industrial truck is configured to alert persons in the surroundings of the industrial truck of the driving direction change.

5. A method for operating an industrial truck that is operated in an at least partially automated manner, the method comprising:
   detecting, in an automated manner with the industrial truck, that the industrial truck approaches a point at which the industrial truck is to perform an intended driving direction change;
   checking, in an automated manner with the industrial truck, at least one predefined direction change criterion for the intended driving direction change prior to initiating the driving direction change; and
   stopping, in an automated manner, prior to initiating the driving direction change, the industrial truck in response to the at least one predefined direction change criterion not being met,
   wherein the at least one predefined direction change criterion requires that a driving direction change signal of the industrial truck associated with the intended driving direction change is activated, and
   wherein the driving direction change signal of the industrial truck is configured to alert persons in the surroundings of the industrial truck of the driving direction change.

6. The method according to claim 5, wherein the at least one predefined direction change criterion further requires that the driving direction change signal associated with the intended driving direction change was active for a predefined lead time before initiating the intended driving direction change.

7. The method according to claim 5, wherein the at least one predefined direction change criterion further requires that a driving velocity of the industrial truck is one of (i) less than and (ii) equal to a predefined limiting value.

8. The method according to claim 5, wherein the at least one predefined direction change criterion further requires that a rotational velocity of the industrial truck is one of (i) less than and (ii) equal to a limiting value predefined as a function of the driving velocity of the industrial truck.

9. The method according to claim 5, the checking further comprising:
   checking the at least one predefined direction change criterion after cornering has been initiated.

10. The method according to claim 5, wherein the method is carried out by a computer program.

11. The method according to claim 10, wherein the computer program is stored on a non-transitory machine-readable storage medium.

* * * * *